G. W. DOBSON.
ROLLER BEARING.
APPLICATION FILED JULY 22, 1914.

1,150,507.

Patented Aug. 17, 1915.
2 SHEETS—SHEET 1.

Witnesses:
Inventor:
George W. Dobson,
By Dyrenforth, Lee, Chritton and Wiles
Att'ys.

G. W. DOBSON.
ROLLER BEARING.
APPLICATION FILED JULY 22, 1914.
1,150,507.
Patented Aug. 17, 1915.
2 SHEETS—SHEET 2.
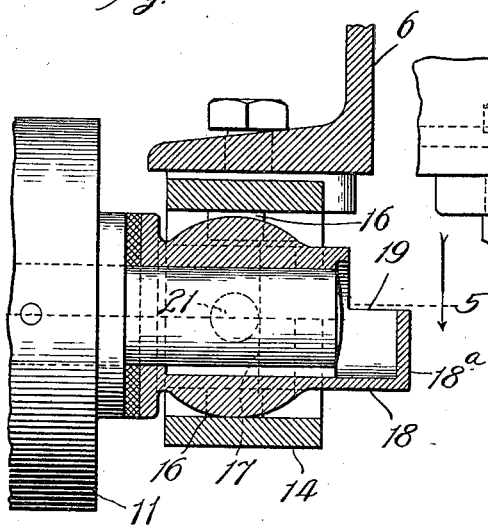
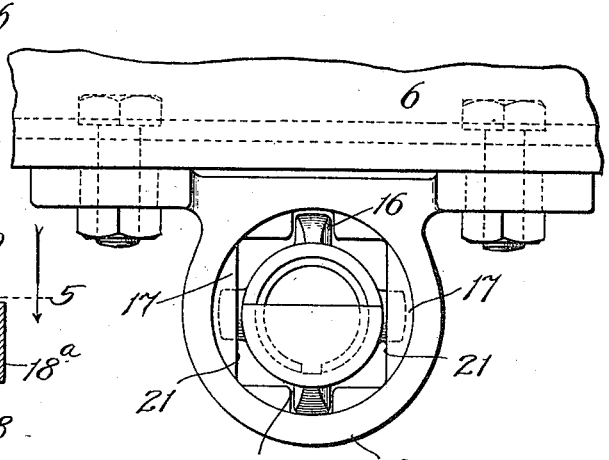
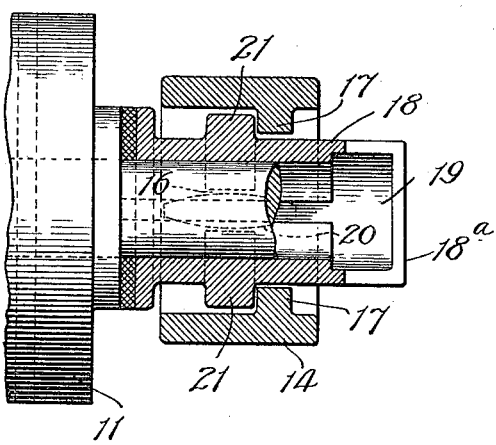
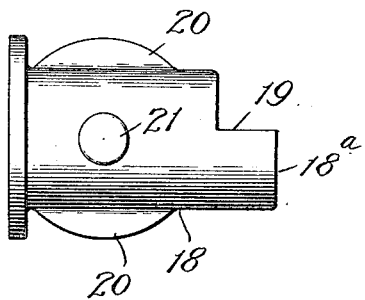
Witnesses:
Inventor:
George W. Dobson,
By Dyrenforth, Lee, Chritton and Wiles
Attys.
COLUMBIA PLANOGRAPH CO., WASHINGTON, D. C.

UNITED STATES PATENT OFFICE.

GEORGE W. DOBSON, OF CHICAGO, ILLINOIS, ASSIGNOR TO THE SCARBOROUGH CO., OF CHICAGO, ILLINOIS, A CORPORATION OF ILLINOIS.

ROLLER-BEARING.

1,150,507.

Specification of Letters Patent.

Patented Aug. 17, 1915.

Application filed July 22, 1914. Serial No. 852,366.

*To all whom it may concern:*

Be it known that I, GEORGE W. DOBSON, a citizen of the United States, residing at Chicago, in the county of Cook and State of Illinois, have invented a new and useful Improvement in Roller-Bearings, of which the following is a specification.

My invention relates to an improvement in the class of conveyers and roller-bearings therefor, in which the rollers are journaled at intervals on side-members and an endless belt travels on the series of rollers.

Figure 1:
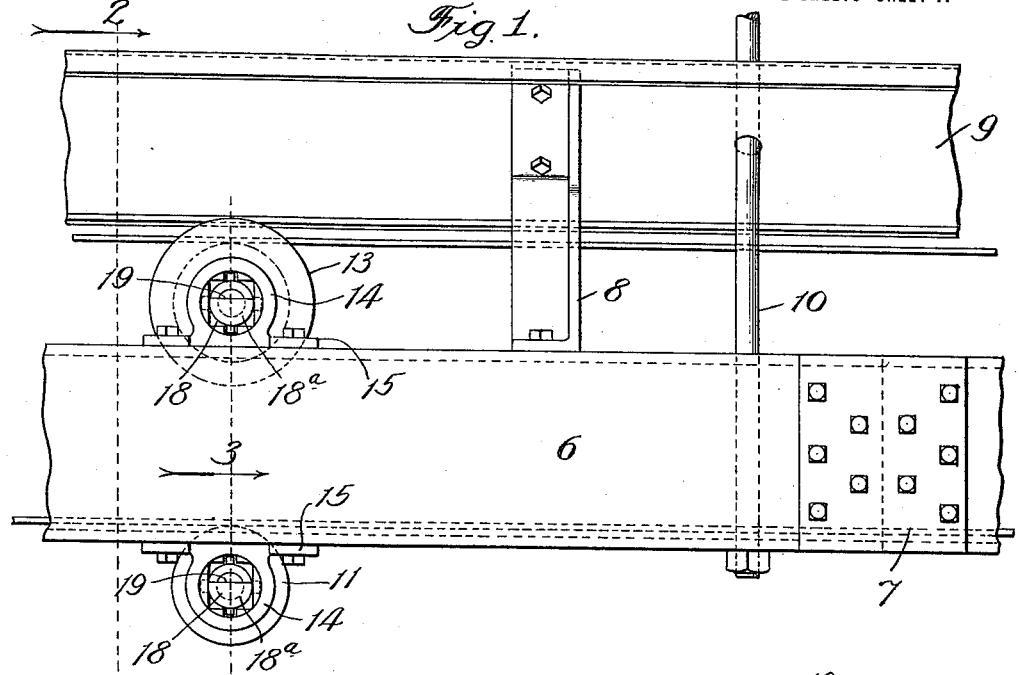
Figure 2:
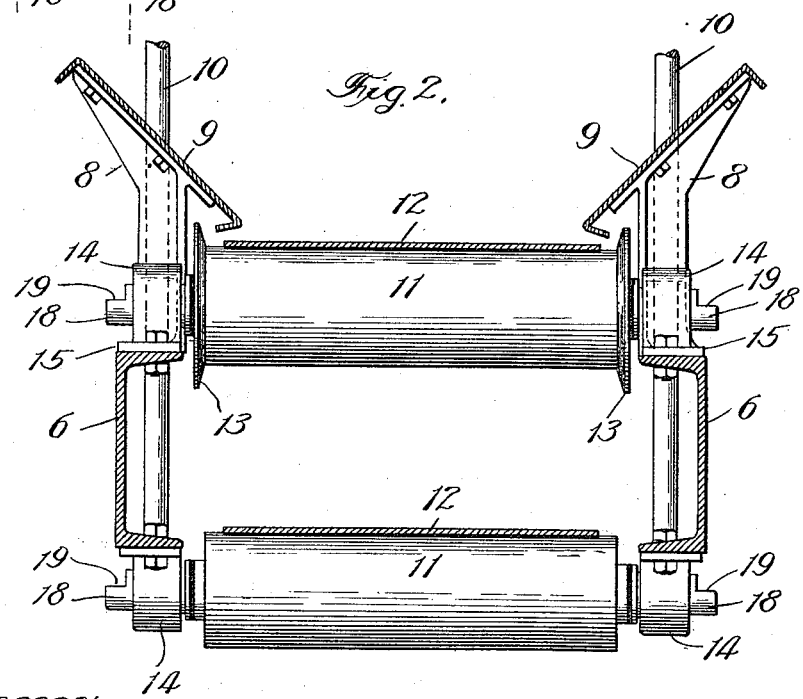

In the accompanying drawings, Figure 1 is a broken view in side elevation of a roller conveyer embodying my improvement; Fig. 2 is a section on line 2, Fig. 1; Fig. 3 is an enlarged section on line 3, Fig. 1, illustrating the roller-bearing construction; Fig. 4 is an end view of the showing in Fig. 3; Fig. 5 is a broken section on line 5, Fig. 3, and Fig. 6 is a view in side elevation of the roller bearing.

The side-members of the conveyer are channel-beams 6, which may be spliced endwise together by means of fish-plates, as shown at 7, to enable the conveyer to be provided in any desired length. Brackets 8 rise at suitable intervals on the side-members to support, in the inclined position represented, lateral guides 9 for the packages carried by the conveyer. Posts 10 are shown passing at intervals through the flanges of the members 6 for suspending the conveyer on an overhead support (not shown); but, as will be understood, the apparatus may, when desired, be supported from underneath on a suitable foundation.

The rollers 11, carrying an endless belt 12, and of which the upper series, or some members thereof, are provided with end-flanges 13 (Fig. 2) for guiding the belt, are journaled at intervals in bearings secured at proper intervals on the outer faces of the upper and lower beam-flanges. Each bearing comprises a ring 14 having laterally-extending perforated feet 15, through which it is bolted in place, and provided internally with upper and lower lugs forming diametrically opposite grooves 16 and opposite lateral stop-lugs 17 near the outer end of the ring. The bearing proper 18 is a tubular casting, preferably of brass, open at its flanged inner end and closed at its outer end at 18$^a$, adjacent to which it contains a rectangular opening 19 for introducing a suitable lubricant for lubricating the roller-trunnions; and on the outer surface of the tube are formed diametrically opposite upper and lower rocker-like fins 20 to enter the ring-grooves 16, and lateral round buttons 21 to abut against the stop-lugs 17, in introducing the bearing-tube into the ring. The rollers 11 are supported at their trunnions in the flanged ends of the bearing-tubes, which afford lubricant-holding cups for lubricating the bearings.

By the described construction of bearing, it is adapted to be applied interchangeably to the upper and lower flange of a channel-beam member 6, with the lubricant-opening 19 necessarily uppermost, since the bearing tube is insertible into an upper as well as into a lower ring 14 by introducing its fins 20 into the grooves 16, to be stopped by abutment of the buttons 21 against the stop-lugs 17. The convex or rocker-like shape of the fins, which confine the bearing-tube against rotation in the ring, permit the tube to rock up and down and the round buttons to roll with the minimum of friction against the stop-lugs in the rotation of the roller-trunnions, thus compensating for wear on the latter and causing smooth turning of the rollers under all conditions. The abutment of the buttons against the stop-lugs, moreover, affords stability to the bearing-tube in rocking under torsional movements of the roller-trunnions therein.

What I claim as new and desire to secure by Letters Patent is:—

1. A roller-bearing comprising an outer ring containing upper and lower grooves, and a tubular member provided with outer fins confined in said grooves, and having an upper lubricant-opening near its closed outer end.

2. A roller-bearing comprising an outer ring containing upper and lower grooves, and a tubular member provided with outer rocker-like fins confined in said grooves.

3. A roller-bearing comprising an outer ring containing upper and lower grooves and lateral stop-lugs, and a tubular member provided with outer rocker-like fins confined in said grooves and lateral round buttons abutting against said lugs.

4. A roller-bearing comprising an outer ring containing upper and lower grooves and lateral stop-lugs, and a tubular member flanged about its inner open end and containing a lubricant-opening near its opposite closed end, said tubular member being provided with outer rocker-like fins confined in said grooves and lateral round buttons abutting against said lugs.

GEORGE W. DOBSON.

In presence of—
A. C. FISCHER,
D. C. THORSEN.

Copies of this patent may be obtained for five cents each, by addressing the "Commissioner of Patents, Washington, D. C."